United States Patent [19]

Wright

[11] Patent Number: 5,096,263
[45] Date of Patent: * Mar. 17, 1992

[54] WHEEL TRIM ATTACHMENT SYSTEM

[76] Inventor: James P. Wright, 1060 Robin La., Cookeville, Tenn. 38501

[*] Notice: The portion of the term of this patent subsequent to Jun. 12, 2007 has been disclaimed.

[21] Appl. No.: 613,295

[22] Filed: Nov. 15, 1990

[51] Int. Cl.[5] .............................................. B60B 7/06
[52] U.S. Cl. ................................ 301/37 S; 310/108 S
[58] Field of Search ............... 301/37 R, 37 S, 37 P, 301/108 R, 108 S, 108 A, 9 DN

[56] References Cited

U.S. PATENT DOCUMENTS

| | | | |
|---|---|---|---|
| 2,640,729 | 6/1953 | Niven | 301/9 DN |
| 3,029,909 | 4/1962 | Thomas | 301/37 R |
| 3,092,420 | 6/1963 | Baldwin et al. | 301/37 |
| 3,918,764 | 11/1975 | Lamme | 301/37 |
| 4,447,091 | 5/1984 | Nguyen et al. | 301/37 |
| 4,729,606 | 3/1988 | Narita et al. | 301/37 S |
| 4,881,783 | 11/1989 | Campbell | 301/37 S |
| 4,932,724 | 6/1990 | Wright | 301/37 S |
| 4,946,228 | 8/1990 | Hsu et al. | 301/37 S |

FOREIGN PATENT DOCUMENTS

| | | | |
|---|---|---|---|
| 1160262 | 1/1984 | Canada | 301/37 |
| 2111253 | 4/1971 | Fed. Rep. of Germany | 301/37 R |
| 622482 | 5/1927 | France | 301/108 S |
| 1172809 | 12/1969 | United Kingdom | 310/301 |
| 2046185 | 11/1990 | United Kingdom . | |

Primary Examiner—Russell D. Stormer
Attorney, Agent, or Firm—Mark J. Patterson; Edward D. Lanquist, Jr.

[57] ABSTRACT

A system for attachment of decorative trim members to trucks or recreational vehicles which is adapted for use with various makes of wheels. Specifically configured, trim member is placed over wheel having two opposite locator pins. Trim member is attached to locator pins using retaining clips. Trim member has further holes for receiving the lugs of the wheel. Decorative lug covers can be placed over lugs or integrally formed with trim member to cover lugs.

8 Claims, 3 Drawing Sheets

WHEEL TRIM ATTACHMENT SYSTEM

BACKGROUND OF THE INVENTION

The present invention relates generally to the attachment of decorative trim members to motor vehicle wheels and more particularly to a trim attachment device and system which are adaptable to a variety of wheels, either front or rear, used on small, medium, and large General Motors trucks, as well as any other truck or recreational vehicle having two locator pins on the wheel.

It is the desire of many owners of trucks and recreational vehicles to improve the cosmetic appearance of their wheels by adding decorative trim rings and the like, performing a function similar to a standard hubcap available on automobiles. Indeed, the prior art contains many examples of methods and brackets that have been developed to accomplish this. Some employ spring clips or hooks which engage under tension the outer portion of the wheel. Others use brackets which mount directly to the wheel lugs and, in turn, provide a central point for attachment of the wheel trim member.

For example, U.S. Pat. No. 3,918,764 issued to Lamme discloses a combined lock bracket and wheel cover for automotive vehicles. However, Lamme uses bracket 26 which must be attached underneath the existing lug nut of a wheel. Many manufacturers have discovered that it is unsafe to remove a lug nut to place a wheel trim attachment member on the wheel. Further, the Department of Transportation requires that all decorative trim members must be removed for a DOT inspection of the wheel. Because the device of Lamme is attached to the wheel using a bracket, Lamme cannot perform this function. Furthermore, Lamme does not recognize and does not teach the use of attachment at a locator pin.

Canadian Patent No. 1,160,262 issued to Ladouceur discloses a wheel cover. Although Ladouceur discloses the use of a trim member that is not fastened by removal of lug nuts, Ladouceur fails to recognize the benefits of attachment at the locator pins found on General Motors vehicles.

U.S. Pat. No. 4,447,091 issued to Nguyen et al. discloses a convertible wire wheel hub cover. Nguyen uses a spring clipped hub cover. Nguyen fails to recognize and take advantage of the locator pins in existence on General Motors wheels.

Similarly, British Patent No. 1,172,809 discloses a motorvehicle wheel disk assembly. This method of attachment uses a bolt placed into the wheel as a method of attachment. It fails to take advantage of the existing locator pins.

British Patent No. 2,046,185 issued to Shalts et al. discloses a locking hub cover for vehicle wheels. However, this device requires the removal of a wheel lug for attachment.

The first patent to take advantage of locator pins is U.S. Pat. No. 4,932,724 issued to Applicant on June 12, 1990. At that time, Applicant felt that in order to attach a wheel trim member, a bracket must be used. Therefore, any trim member system practicing Applicant's earlier patent must use the bracket and an interior screw or bolt to hold trim member to bracket.

What is needed, then, is a system that provides a secure and consistent centered means for attachment of wheel trim members, which is easy to install, which is inexpensive to manufacture, which is readily removable for inspection, and which is readily adaptable to more than one wheel configuration with a minimum of components.

SUMMARY OF THE INVENTION

In the present invention, a single wheel trim attachment kit is adaptable for use with large trucks and recreational vehicle wheels having two locating pins. The kits contain a wheel trim member having evenly spaced lug covers to cover the existing lugs on the wheel. This trim member also has opposite holes placed through it to receive the opposite locator pins on the wheel. Push pins or locator pins are used to install wheel trim to the existing wheel.

The object of the present invention is to provide a universal wheel trim attachment system and kit that can be used on any wheel of like diameter having opposite locator pins.

Another object of the present invention is to provide a wheel trim attachment system that maintains a secure and consistently centered mounting point for the wheel trim which is easy to install and remove.

Still a further object of the present invention is to provide a wheel trim attachment system that does not require the removal of any lugs and which does not require a bracket.

DESCRIPTION OF THE PREFERRED EMBODIMENT

The wheel trim attachment system of the present invention is preferably supplied as a kit which would enable a purchaser to attach and secure conventional wheel trim members to large truck or recreational vehicle wheels having opposite locator pins. Normally, opposite locator pins are installed in all General Motors chassis, trucks, and recreational vehicles. This system must be easily removable for inspection and transfer to another vehicle. Accordingly, a kit derived from the present system comprises either rear trim member 10 or front trim member 12. Trim members 10, 12 are sized to fit wheels having a 16 inch, 16.5 inch, or 19.5 inch diameter.

Figure 1:
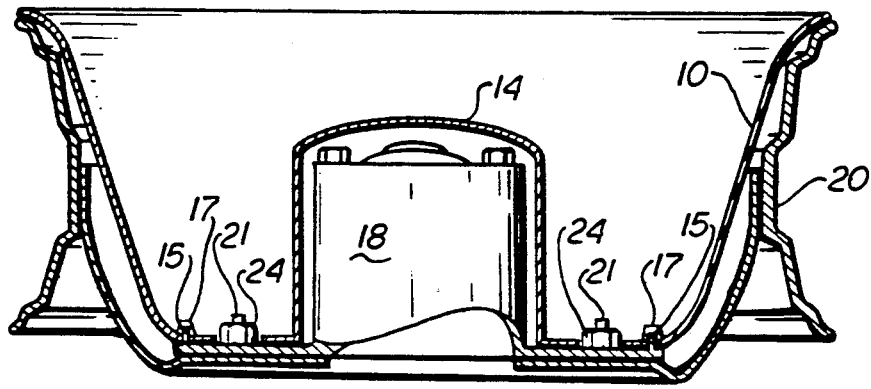
FIG. 1 is a cutaway view of a rear wheel having two opposite locator pins.

Referring to FIG. 1, there is shown generally at 10 the rear trim member of the present invention. Rear trim member 10 is meant to parallel the configuration of the bowl of rear wheel 20. Trim member 10 has opposite holes 9 to receive locator pin 15 of wheel 20. Trim member 10 also has lug holes 26 to receive lug nuts 24 of wheel 20. Trim member 10 has lug cover 14 that rises around hub 18.

Figure 2:
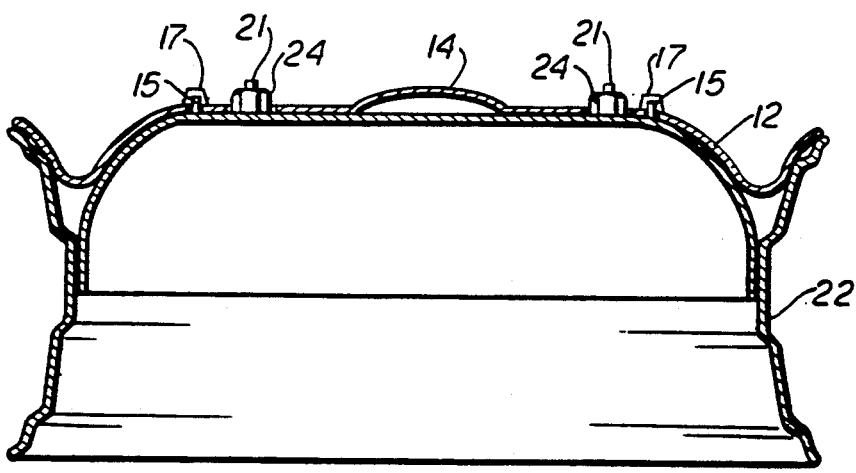
FIG. 2 is a cutaway view of a front wheel having two opposite locator pins.

Referring now to FIG. 2, there is shown generally at 12 the front trim member for front wheel 22. Trim member 12 has oppositely placed holes 9 to receive locator pins 15. In both FIG. 1 and FIG. 2, push pin fastener 17 is used to attach trim member 10, 12 to wheel 20, 22. In FIG. 2, member 12 also has lug hole 26 to receive lug 24.

Figure 3:
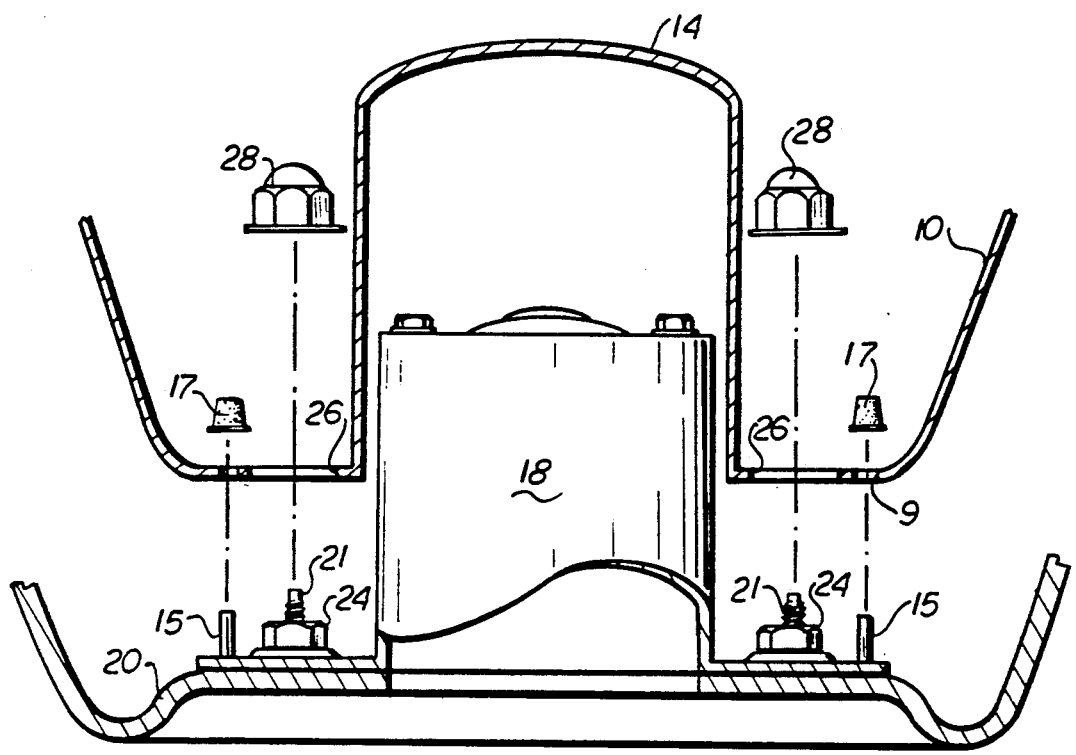
FIG. 3 is an exploded view of the rear wheel trim attachment system.

Referring now to FIG. 3, an exploded view of the attachment of trim member 10 is placed over hub 18. Trim member 10 then receives locator pins 15 through hole 9 and lugs 24 through hole 26. Push pin fastener 17 then attaches trim member 10 to locator pin 15. Decorative lug cover 28 can be placed over lug 24 to provide a more uniform look. In the preferred embodiment as can be seen in FIG. 7, lug cover 28 is integrally constructed to trim member 10, 12 and fixed proximate to lug hole 26.

Figure 4:
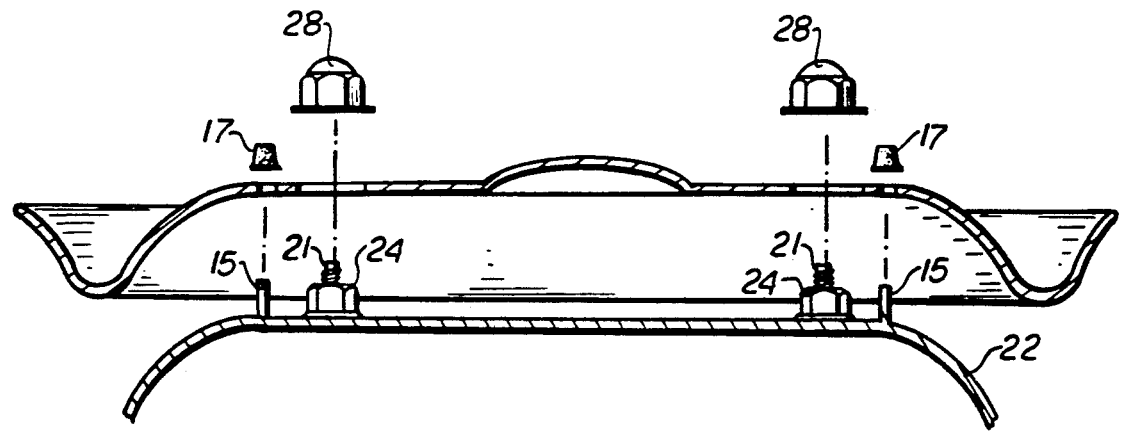
FIG. 4 is an exploded view of a front wheel showing attachment of the trim member to the locator pins.

FIG. 4 shows attachment of trim member 12 to front wheel 22. Trim member 12 has holes 9 for receipt of locator pins 15. Member 12 also has holes 26 for receipt of lugs 24. Lug covers 28 Can be placed over lugs 24 after trim member 12 has been fastened by use of push fasteners 17.

Figure 5:
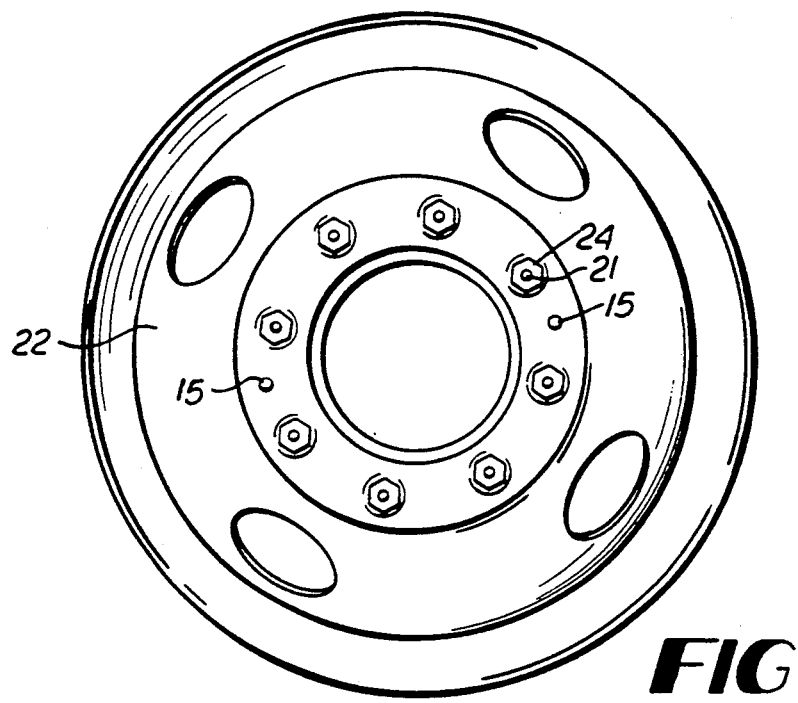
FIG. 5 is a plan view of a front wheel having opposite locator pins.
Figure 6:
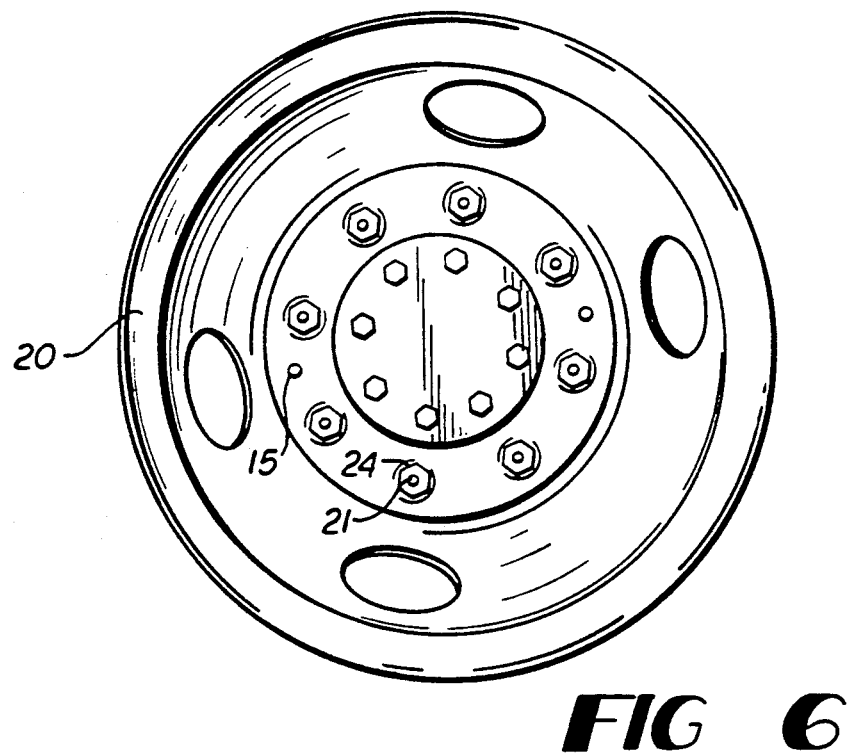
FIG. 6 is a plan view of a rear wheel having opposite locator pins.

FIGS. 5 and 6 generally demonstrate a plan view of a front and rear wheel having locator pins 15.

In the preferred embodiment, fasteners 17 are push-in fasteners of the Tinnerman or PDL-Push Nut design.

On General Motors wheels, locator pins 15 are fixed approximately 19.2 cm apart and oriented such that the center of member 10, 12 will be at center of wheel 20, 22.

The industry standard is 8 on 6.5 inch bolt circle pattern. Trim members 10, 12 will be designed such that lug cover 28 will receive lugs 24 in this configuration.

Thus, although there have been described particular embodiments of the present invention of a new and useful wheel trim attachment system, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

I claim is:

1. A decorative trim member attachment system for use with a wheel having lugs and lug nuts conventionally secured to truck and recreational vehicle chassis without removing said lug nuts, said wheel having a conventional wheel lug pattern and at least two locator pins other than said lugs integral to said wheel comprising:
    a. a trim member having holes oppositely placed for receipt of said locator pins position on said wheels; and
    b. means for securing said trim member to said locator pins.

2. The system of claim 1 further comprising plural push-on fasteners adapted for the secure engagement of said locator pins.

3. A decorative wheel trim attachment kit adapted for universal use with a front wheel having lugs and lug nuts used on General Motors trucks or recreational vehicle chassis, said wheels having a standardized wheel diameter and lug bolt center pattern and two integral diametrically opposed locator pins integral to said wheel other than said lugs comprising:
    a. said trim member having holes located at opposed outer ends of said trim member adapted for engagement of said locator pins; and
    b. two removable fastener means for securing said trim member to said wheel.

4. The attachment kit of claim 3 wherein said trim member having holes placed through it for receiving said lug nuts.

5. The attachment kit of claim 4 further comprising lug covers integrally placed in said lug holes for covering said lug nuts.

6. A decorative wheel trim attachment kit adapted for universal use with dual wheels having lugs, corresponding lug nuts an a hub used on General Motors trucks and recreational vehicle chassis without removing said lug nuts, said wheels having a standardized wheel diameter and lug bolt center pattern and two diametrically opposed locator pins integral with said wheel other than said lugs comprising:
    a. A trim member having a hub cover to conform to said hub, said trim member having holes located at opposed outer ends of said member adapted for engagement of said locator pins; and
    b. two removable fastener means for securing said bracket to said wheel.

7. The attachment kit of claim 6 wherein said trim member having holes placed through it for alignment with said lug bolt center pattern.

8. The attachment kit of claim 6 further comprising lug covers integrally placed in said lug holes for covering said lug nuts.

* * * * *